United States Patent
Shimoyama (10) Patent No.: US 7,346,161 B2
(45) Date of Patent: Mar. 18, 2008

(54) METHOD AND APPARATUS FOR DESIGNING CIPHER LOGIC, AND A COMPUTER PRODUCT

(75) Inventor: Takeshi Shimoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 09/739,219

(22) Filed: Dec. 19, 2000

(65) Prior Publication Data

US 2001/0019610 A1  Sep. 6, 2001

(30) Foreign Application Priority Data

Jan. 26, 2000  (JP)  ............................. 2000-016413

(51) Int. Cl.
- H04K 1/00 (2006.01)
- H04K 1/04 (2006.01)
- H04K 1/06 (2006.01)
- H04L 9/00 (2006.01)
- H04L 9/28 (2006.01)
- G06F 11/30 (2006.01)
- G06F 12/14 (2006.01)
- H04L 9/32 (2006.01)

(52) U.S. Cl. ............................. 380/29; 380/28; 380/37; 380/42; 380/44; 713/189; 713/168

(58) Field of Classification Search .................. 380/28, 380/29, 37, 44, 42; 713/189, 168
See application file for complete search history.

(56) References Cited

U.S. PATENT DOCUMENTS

| 5,003,597 | A | * | 3/1991 | Merkle | ......................... 380/37 |
| 5,778,074 | A | | 7/1998 | Garcken et al. | |
| 5,796,837 | A | * | 8/1998 | Kim et al. | ...................... 380/28 |
| 6,005,944 | A | * | 12/1999 | Blaze | .......................... 380/42 |
| 6,031,911 | A | * | 2/2000 | Adams et al. | ................ 380/29 |
| 6,182,216 | B1 | * | 1/2001 | Luyster | ....................... 713/168 |
| 6,501,840 | B1 | * | 12/2002 | Saijo | ........................... 380/37 |

OTHER PUBLICATIONS

Preneel et al., Recent Developments in the Design of Conventional Cryptographic Algorithms, Jun. 1997, Springer-Verlag, XP000979891, pp. 105-130.*

Schneier et al., "Fast Software Encryption: Designing Encryption Algorithms for Optimal Software Speed on the Intel Pentium Processor", XP-008002230, pp. 242-259.

Preneel et al., "Recent Developments in the Design of Conventional Cryptographic Algorithms", XP-000979891, pp. 105-130.

* cited by examiner

Primary Examiner—Ayaz Sheikh
Assistant Examiner—Shin-Hon Chen
(74) Attorney, Agent, or Firm—Staas & Halsey LLP (57) ABSTRACT

An optimization processing unit optimizes an input and output bit number of an S-box based on parameters inputted from an input unit. The examples of the parameters are memory capacity of a primary cache memory, entire input and output bit number, and smallest input and output number of the S-box. An S-box generating unit generates an S-box in accordance with the optimized input and output bit number of the S-box. Then, an F-function generating unit generates an F-function by aligning a plurality of S-boxes thus generated.

15 Claims, 8 Drawing Sheets

METHOD AND APPARATUS FOR DESIGNING CIPHER LOGIC, AND A COMPUTER PRODUCT

FIELD OF THE INVENTION

The present invention in general relates to a method and apparatus for designing cipher logic of a cipher apparatus that effects cipher or decryption per block by using an F-function for converting input bits to output bits by means of a plurality of S-boxes. More particularly, this invention relates to a method and apparatus capable of selecting swiftly and efficiently an optimal S-box that meets a computer performance when designing common key block cipher having S-boxes. This invention also relates to a computer readable recording medium which stores thereon a computer program which when executed realizes the method according to the present invention on a computer.

BACKGROUND OF THE INVENTION

With the recent advancement of communication information technology, important information is being provided through various types of communication media including wired, wireless, and satellite communications. However, it is necessary that such important information is transmitted in a most secured manner.

Various kinds of cipher protocols, such as secret-key cryptosystem or public-key cryptosystem, have been developed and used for transferring the information in a secured manner. The secret-key cryptosystem, which is a type of the common key block cipher, has proved to be most suitable for high-speed cipher communication.

A variety of cipher algorithms have been proposed as the conventional common key block cipher. Most of such algorithms adopt a simple and repetitive structure referred to as the Feistel structure. In an internal portion of this Feistel structure, which is also referred to as F-function, non-linear functions referred to as S-boxes are aligned, and a combination of outputs is dispersed by a linear function in most of the cases. The internal structure referred to as the F-function is generally known as SPN (Substitution Permutation Network) structure.

It is by no means easy to design the S-boxes that form the security core of the common key block cipher. Also, as more kinds of S-boxes are used, a larger memory capacity is required to store the S-boxes. Hence, in the general common key block cipher, in order to reduce the development costs of the S-boxes and memory capacity and thereby simplify the structure thereof, the same S-box is used repetitively or the S-boxes having the same input size or output size are reused.

Because the input bit number in the common key block cipher is generally 64 or 128, S-boxes having the $2^n$-bit input are used when using the S-boxes of the same size without any duplication. However, the S-boxes actually have either the 4-bit or 8-bit input due to restriction of implementation.

That is, because the S-boxes are the portions that are most frequently referred to in the cipher apparatus, they are most likely to affect the cipher rate. For this reason, it is desirable to design in such a manner that the entire table representing the S-boxes is enclosed in a fastest referable storage device (generally, a primary cache memory) in the computer. However, if the input bit number of the S-boxes increases, the table size gradually increases exponentially. Because there is an upper limit of the practically usable table size, if reference should be made to a table exceeding the capacity of the storage device, the access rate drops more than the numerical value. In view of the foregoing, only the 4-bit input and 8-bit input are the alternatives for the S-boxes having the $2^n$-input to avoid disadvantages in the as implemented state.

The memory capacity of the present day computers is increasing year after year. Although it may be too early to adopt the S-boxes having the 16-bit input, it cannot be said that the memory source of the computers is fully utilized by the S-boxes having the 8-bit input.

In other words, S-boxes having the input of the fewer bit number can be enclosed in the primary cache memory in computers of almost any type. In this case, however, the total number of the S-boxes increases, and so does the number of times for referring to the S-boxes, thereby posing a problem that the performance rate is reduced.

Conversely, S-boxes having the input of the greater bit number can reduce the number of times for referring to the S-boxes, but the size of the table forming the S-boxes is increased. Hence, the S-boxes cannot be enclosed in the primary cache memory, and have to be installed in other storage device having the lower referring rate. For this reason, each reference to the table takes longer, thereby causing a problem that an overall performance rate is reduced.

In view of the foregoing, it is quite important how an optimal S-box that meets the computer performance should be selected when designing the common key block cipher having the S-boxes.

SUMMARY OF THE INVENTION

It is an object of the present invention to provide a method and apparatus for designing cipher logic capable of selecting swiftly and efficiently an optimal S-box that meets the computer performance when designing common key block cipher having the S-boxes. It is an another object of the present invention to provide a computer readable recording medium which stores thereon a computer program which realizes the method according to the present invention on a computer.

In the method and apparatus for designing cipher logic of the present invention, input and output bit number of the plurality of S-boxes is selected based on the memory capacity of the high-speed referable memory provided to the cipher device, and a plurality of S-boxes having the selected input and output bit number are generated. Consequently, an optimal S-box that meets the computer performance can be selected swiftly and efficiently when designing the common key block cipher having the S-boxes.

The recording medium of the present invention stores thereon a computer program which realizes the method according to the present invention on a computer. Accordingly, the method according to the present invention can be realized easily and automatically on the computer.

Other objects and features of this invention will become apparent from the following description with reference to the accompanying drawings.

DESCRIPTION OF THE PREFERRED EMBODIMENTS

A preferred embodiment of the method and apparatus for designing cipher logic, and the recording medium of the present invention will be explained below with reference to the accompanying drawings. The following explanation assumes a case where a Pentium II processor having a 16-Kbyte primary cache memory is used.

Figure 1:
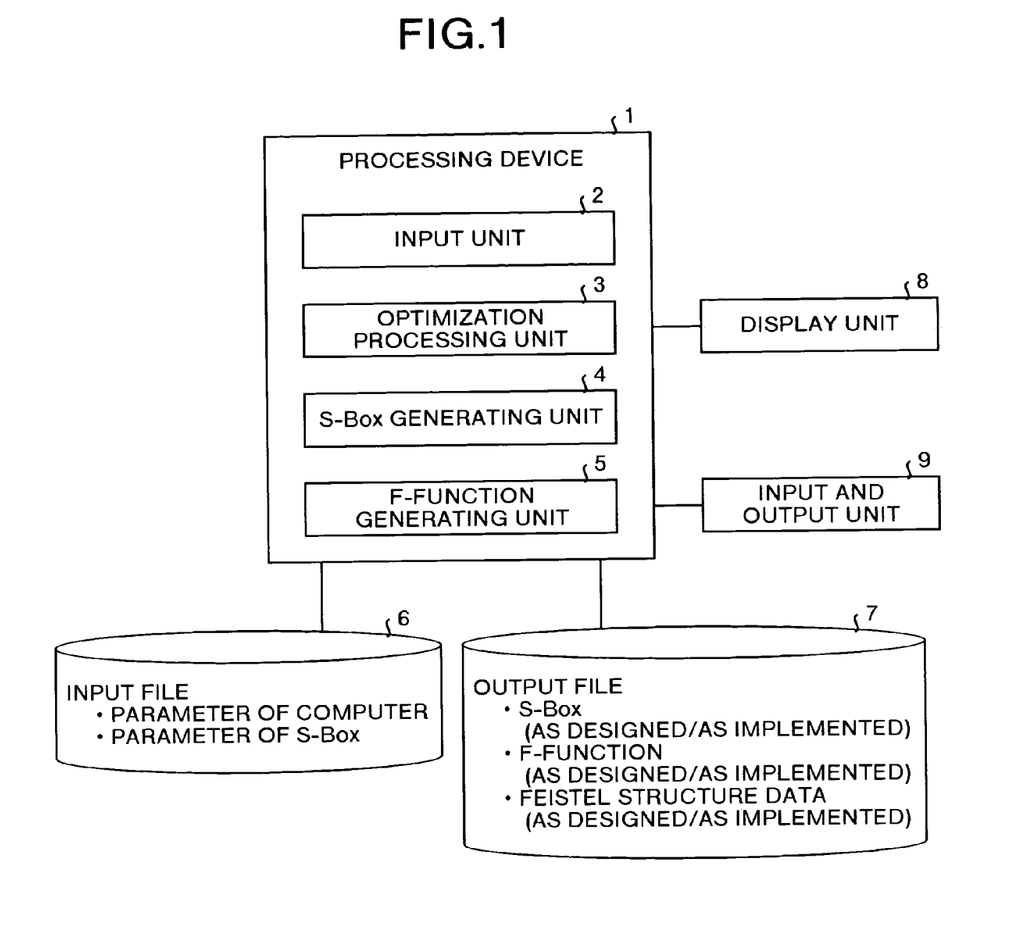
FIG. 1 is a function block diagram showing an arrangement of a cipher designing apparatus according to an embodiment of the present invention.

To begin with, configuration of the cipher designing apparatus according to the present embodiment will be explained. FIG. 1 is a function block diagram showing the configuration of the cipher designing apparatus of the present invention. The processing device 1 downloads programs read out from a not shown recording medium in its not shown main memory and starts to run each process described below. The processing device 1 comprises an input unit 2, an optimization processing unit 3, a S-box generating unit 4, a F-function generating unit 5 and the like.

The input unit 2 is used when inputting parameters. The examples of the parameters are, memory capacity of the primary cache memory in the computer, entire input and output bit number, and smallest input and output number of the S-box.

The optimization processing unit 3 optimizes the input and output bit number of the S-box based on the parameters inputted from the input unit 2.

That is, the optimization processing unit 3 divides a value 32 given as the entire input and output bit number by a value 5 given as the smallest input and output number to yield a set of "5 5 5 5 5", and allocates the remainder to the remotest positions to yield a set of "6 5 5 5 5 6". Subsequently, the optimization processing unit 3 combines every adjacent two or three bit strings to yield a set of "11 10 11" or "16 16". Then, the optimization processing unit 3 judges whether or not these can be enclosed in the primary cache memory, and selects the one judged as enclosable as the optimal input and output bit number.

The reason why the above process is carried out is as follows. By adopting the S-box having the largest size within the memory capacity of the primary cache memory, not only can the high-speed accessible primary cache memory be fully utilized, but also the number of times for accessing the S-box can be reduced, thereby realizing high-speed cipher/decryption.

The S-box generating unit 4 generates the S-box in accordance with the optimized input and output number of the S-box. That is, the S-box generating unit 4 generates an S-box having the input and output number optimized by the optimization processing unit 3.

The F-function generating unit 5 generates the F-function. That is, the F-function generating unit 5 aligns a plurality of S-boxes generated by the S-box generating unit 4, and generates an F-function that linearly transforms the output from each S-box collectively by inputting the exclusive OR operation result of the input and a key to each S-box.

An input file 6 comprises a computer parameter file which stores the memory capacity of the primary cache memory in the computer or the like, and a S-box parameter file which stores all kinds of data related to the S-box and the like.

An output file 7 comprises an output file of the S-box (as designed/as implemented), an output file of the F-function (as designed/as implemented), and an output file of the Feistel structure data (as designed/as implemented). This output file 7 may comprise other files which are not mentioned here.

The display device 8 is a CRT, a liquid crystal panel or the like. This display device 8 displays images. The input and output device 9 includes devices such as printers, disk devices, a display devices, a memory device, etc.

Figure 2:
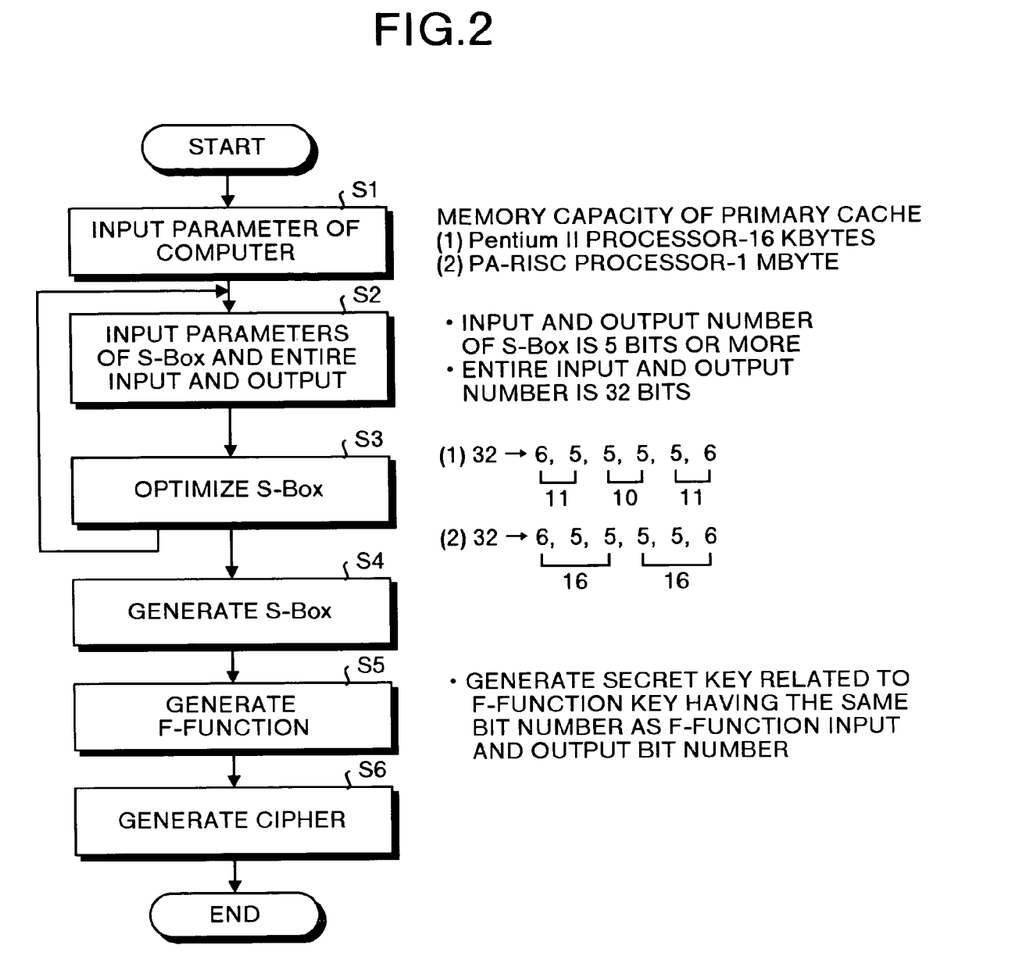
FIG. 2 is a flowchart showing a processing procedure of the cipher designing apparatus shown in FIG. 1.

Next, the sequence of the procedure performed by the cipher designing apparatus shown in FIG. 1 will be explained here with reference to FIG. 2. As shown in FIG. 2, with the cipher designing apparatus, the memory capacity of the primary cache memory in the computer is inputted as a parameter in the first place (Step S1). For example, in case of a Pentium II processor, "16 Kbytes" is inputted and in case of a PA-RISC processor, "1 Mbyte" is inputted.

Then, parameters of the S-box and the entire input and output are inputted (Step S2). Assume that the input and output bit number of the S-box is 5 or greater, and the entire input and output bit number is 32.

Then, the S-box is optimized (Step S3). That is, a value 32 given as the entire input and output bit number is divided by a value 5 given as the smallest input and output bit number of the S-box to yield a set of six 5-bit strings, "5 5 5 5 5 5", and 2-bit remainder. Then, the 2-bit remainder is allocated to the remotest positions, for example, at the left end and right end to yield a set of "6 5 5 5 5 6".

Subsequently, a combination number of combination bit strings is determined based on the memory capacity of the primary cache memory, and the S-box is optimized by combining the above six bit strings based on the combination number. For example, when the memory capacity of the primary cache memory is 16 Kbytes, every two bit strings are combined to yield a set having three combinations, "11 10 11". When the memory capacity of the primary cache memory is 1 Mbyte, every three bit strings are combined to yield a set having two combinations, "16 16". How the combination number is determined based on the memory capacity of the primary cache memory will be described below.

Subsequently, the S-box is generated based on the optimized input and output bit number of the S-box (Step S4), and the F-function (the secret key related to the F-function, a key having the same bit number as the F-function input and output bit number, etc.) is generated by using the S-box thus generated (Step S5), after which cipher is generated by using the F-function thus generated.

By the foregoing series of processes, the input and output bit number of the S-box can be optimized automatically upon input of the parameters (the memory capacity of the primary cache memory and the entire input and output bit number) of the computer or the like, thereby making it possible to generate the optimized S-box, F-function, and cipher.

Figure 3:
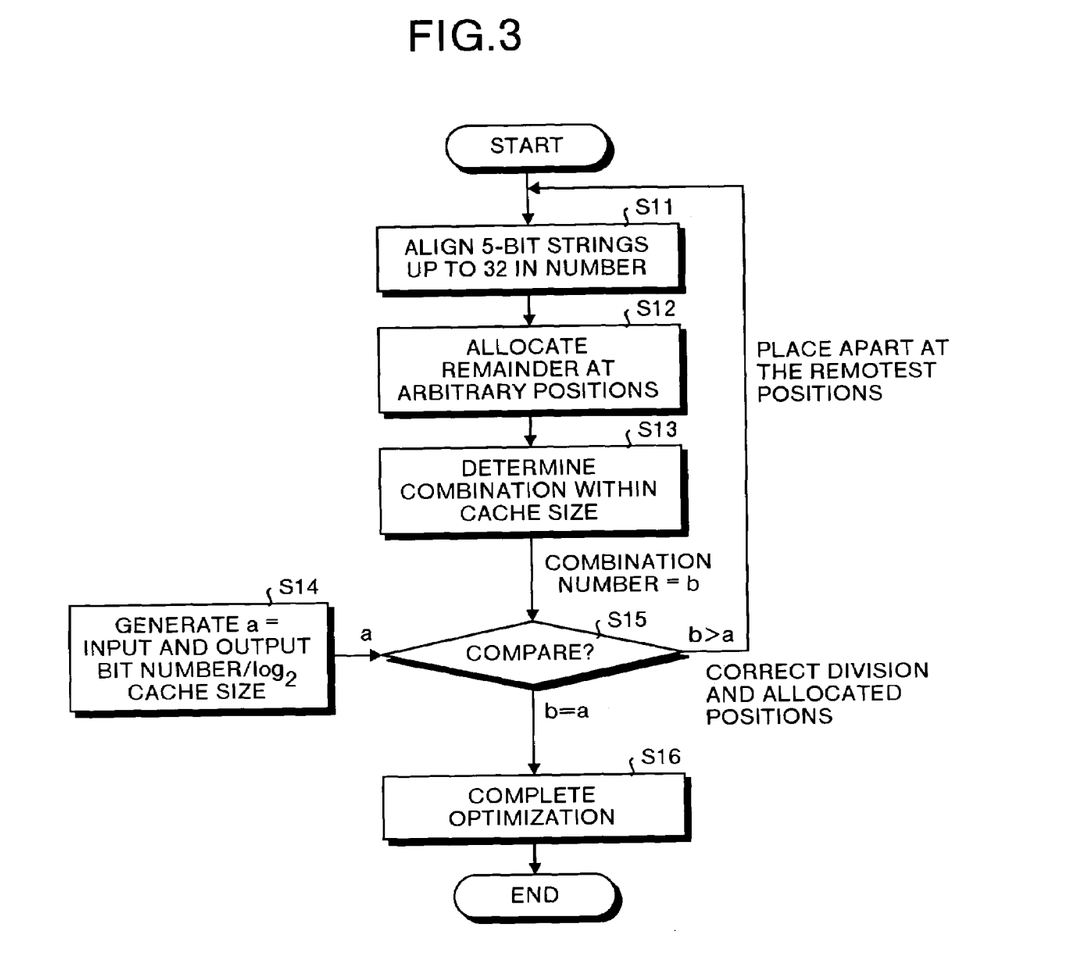
FIG. 3 is a flowchart showing an S-box optimization procedure cited in Step S3 of FIG. 2.

Next, the S-box optimization procedure cited in Step S3 of FIG. 2 will be explained more in detail. FIG. 3 is a flowchart showing the S-box optimization procedure cited in Step S3 of FIG. 2. Assume that the input and output bit number of the S-box is 5 or greater, and the entire input and output bit number is 32.

As shown in FIG. 3, 5-bit strings are aligned in a total up to 32 bits in the first place (Step S11). More specifically, the smallest value is determined as 5 bits from the input parameter (the input and output bit number of the S-box is 5 or greater), and a value 32 given as the entire input and output bit number is divided by a value 5 determined as the smallest input and output bit number of the S-box. Then, divided bit strings are aligned in a total up to 32 bits, thereby yielding a set of "5 5 5 5 5" (with the 2-bits remainder).

Then, the 2-bit remainder is allocated to any desired positions (Step S12). Herein, the remotest positions are selected, and the two bits are allocated respectively to the left end and right end to yield a set of "6 5 5 5 5 6".

Subsequently, a combination such that does not exceed the memory size of the primacy cache memory is found (Step S13). More specifically, every two or three of the input output bit numbers of the S-boxes aligned in Step S12 are combined from the left end to yield a set of "11 10 11" (when combining every two input and output numbers), and a set of "16 16" (when combining every three input and output numbers).

Then, a=an integer portion of ((entire input and output bit number)/$\log_2$ (cache size))+1 is calculated (Step S14). For example, given 32 as the entire input and output bit number and 16 Kbytes as the cache size, then $$a = \text{an integer portion of } (32)/(\log_2(16384)) + 1$$
$$= \text{an integer portion of } (32/14) + 1$$
$$= (\text{an integer portion of } 2.28) + 1$$
$$= 3.$$

Subsequently, the combination number b obtained after the combining process at Step S13 is compared with the value a (the value of the final combination number) obtained in Step S14 (Step S15). When b=a (when the combination number b in Step 13 is equal to the final value a (for example, 3)), the optimization process is completed (Step S16). On the other hand, when b>a, the cipher designing apparatus returns to Step S11 to repeat the combining process.

In this manner, the entire input and output number (for example, 32 bits) is divided by the smallest input and output number (for example, 5 bits) of the S-box specified by the parameter, and the divided bit strings are aligned. When there is a remainder, the remainder is allocated to the remotest positions to generate a set of tentative input and output numbers of the S-box. The input and output number is optimized by repetitively combining the input and output numbers until the combination number b becomes equal to the final value a found from the entire input and output bit number and the cache size. Thus, the number of times for referring to the S-boxes is reduced by minimizing the combination number of the S-boxes so as to be enclosed in the primary cache memory, thereby making it possible to optimize the S-box separately for each computer.

Figure 4:
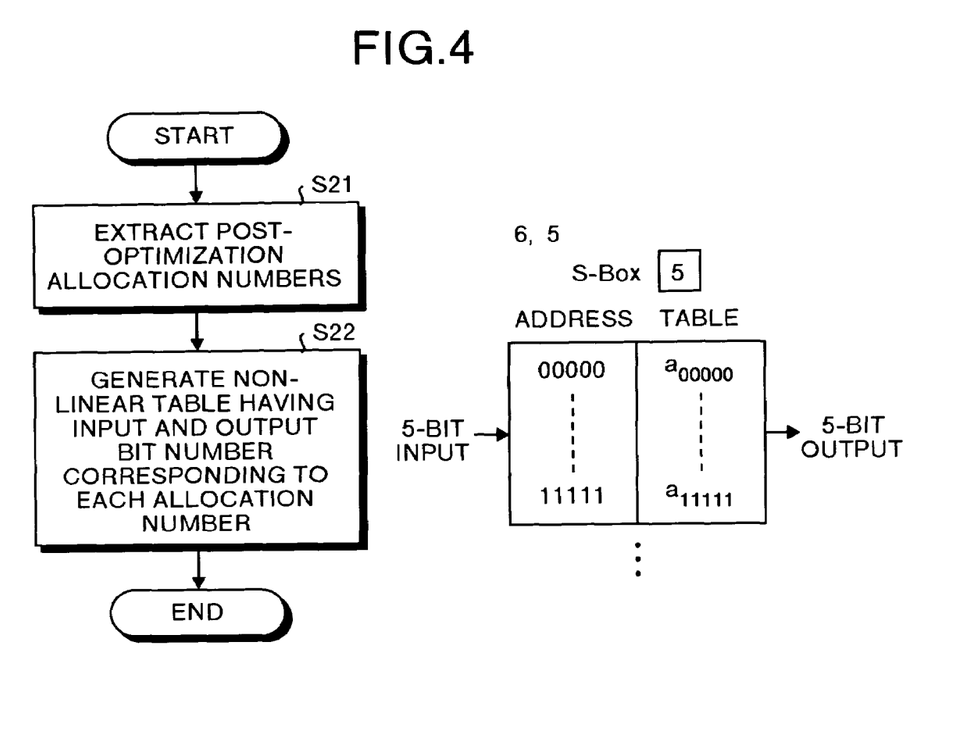
FIG. 4 is a flowchart showing an S-box generation procedure of an S-box generating unit shown in FIG. 1.

Next, the following description will describe the S-box generation procedure of the S-box generating unit 4 shown in FIG. 1. FIG. 4 is a flowchart showing the S-box generation procedure of the S-box generating unit 4 shown in FIG. 1.

As shown in FIG. 4, the post-optimization allocation numbers are extracted in the first place (Step S21). For example, in case of the optimization with three combinations as was explained in Step S3 of FIG. 2, values 6 and 5 are extracted.

Then, a non-linear table having the input output bit number corresponding to each allocation number is generated (Step S22). For example, as shown in the right side of the drawing, a non-linear table having the 5-bit input as an address and a 5-bit output is generated. Also, a non-linear table for 6 bits is generated. With the above procedure, the non-linear tables as many as the combination number of the S-boxes after the optimization can be generated.

Figure 5:
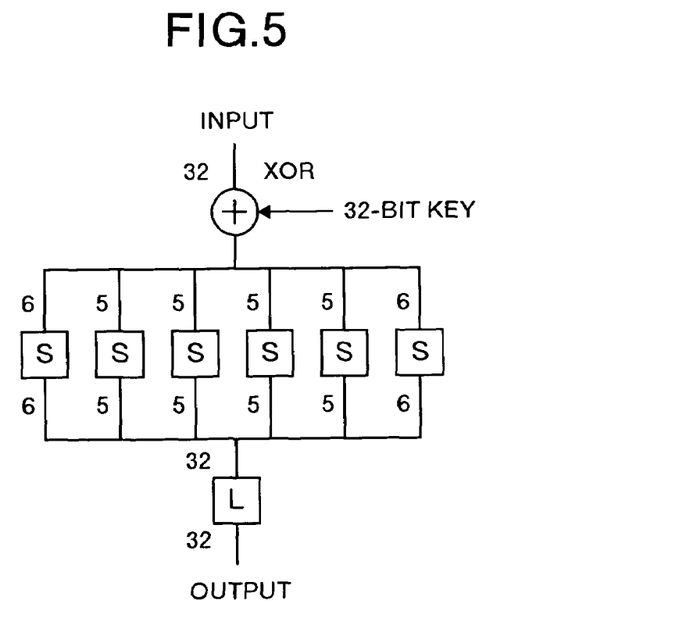
FIG. 5 is a diagram showing an example of an F-function (as designed) generated by an F-function generating unit shown in FIG. 1.

Next, the following description will describe an example of the F-function generated by the F-function generating unit 5 shown in FIG. 1. FIG. 5 is a view showing an example of the F-function (as designed) generated by the F-function generating unit 5 shown in FIG. 1.

As shown in FIG. 5, the S-boxes (non-linear tables) generated in the processing procedure detailed in FIG. 4 are aligned and interconnected with each being denoted by a capital letter S. An exclusive OR of the entire input and output number of 32 bits and 32-bit key is computed, and the computation result of the XOR is divided to 6 bits, 5 bits, 5 bits, 5 bits, 5 bits, and 6 bits. Then, the circuit is formed to input these divided bits into their respective S-boxes. Also, the circuit is formed to add up the output bits from all the S-boxes to 32 bits so as to be outputted through a linear transformation circuit L. According to the above arrangement, the F-function using the S-boxes each having the optimized input and output number for each computer can be generated (designed).

Figure 6:
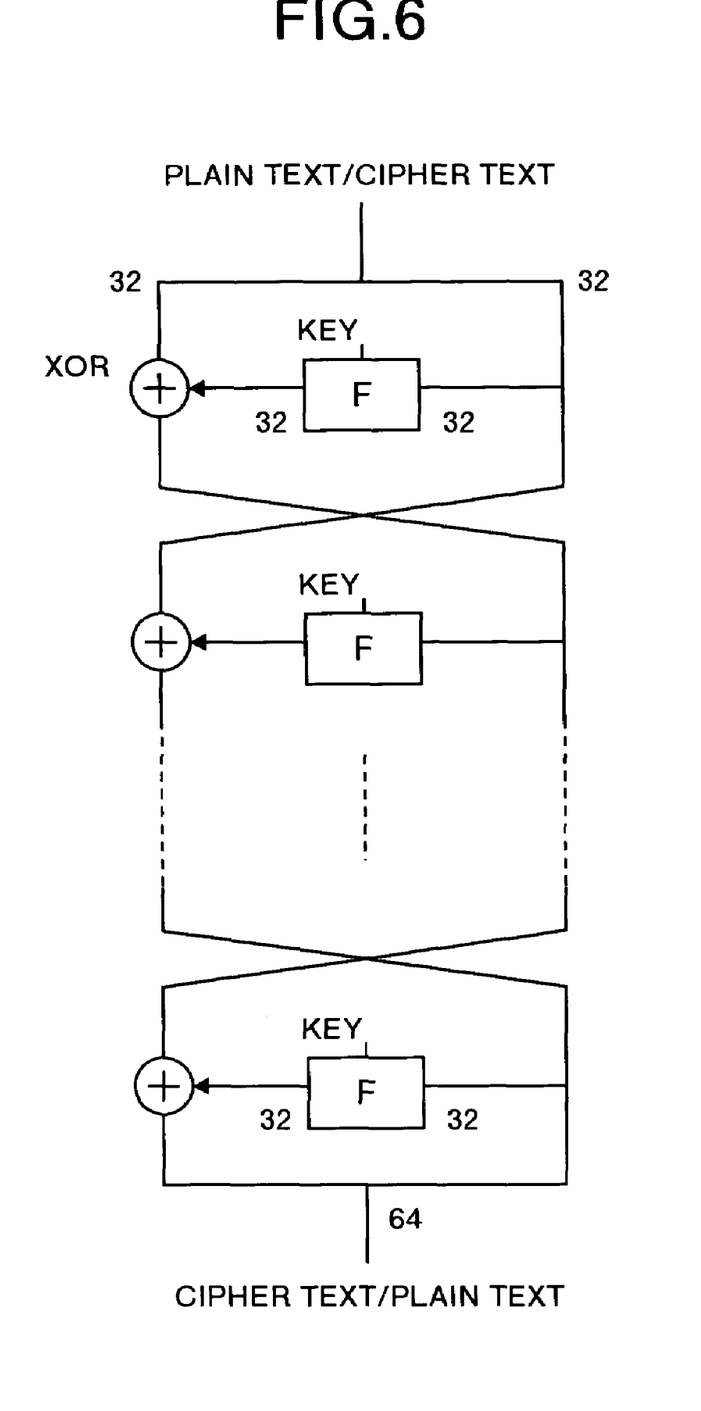
FIG. 6 is a diagram showing an example of the Feistel structure when the F-function shown in FIG. 5 is used.

Next, the following description will describe an example of the Feistel structure using the F-function shown in FIG. 5. FIG. 6 is a diagram showing an example of the Feistel structure using the F-function shown in FIG. 5.

The Feistel structure shown in FIG. 6 operates as a cipher circuit or a decryption circuit, and upon input of a plain text or a cipher text from the top portion, processing results are flown downward as indicated by arrows, and a cipher text or a plain text is outputted from the bottom. Because referring to the S-boxes each forming the F-function within the illustrated structure is optimized so that access is allowed on the primary cache memory in each computer, the cipher process or decryption process can be performed at a high-speed by fully utilizing the primary cache memory unique to each computer.

Figure 7:
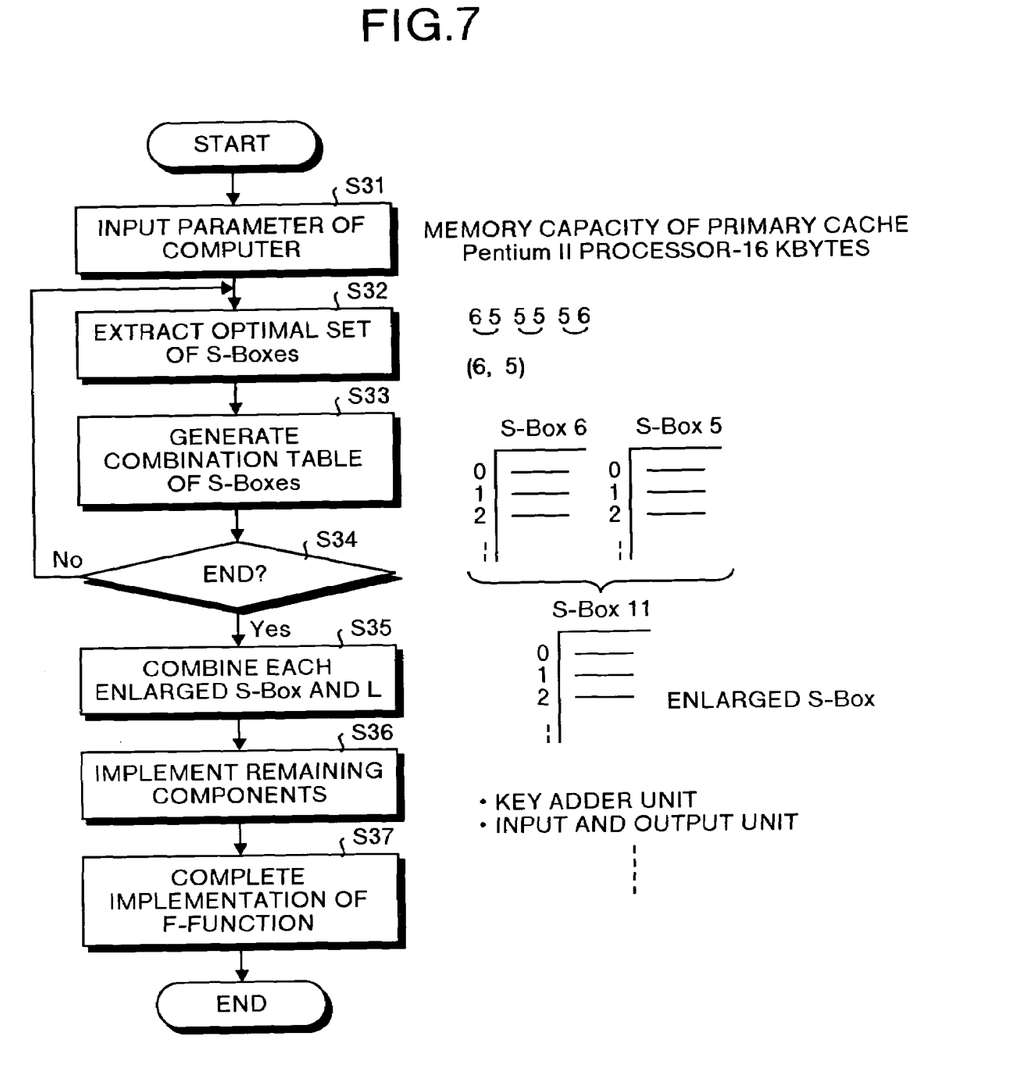
FIG. 7 is a flowchart showing a processing procedure when the cipher designing apparatus shown in FIG. 1 is implemented to a computer.

Next, the following description will describe the processing procedure when the cipher designing apparatus shown in FIG. 1 is implemented to a computer. FIG. 7 is a flowchart showing the processing procedure when the cipher designing apparatus shown in FIG. 1 is implemented to a computer.

As shown in FIG. 7, the memory capacity of the primary cache memory in the computer is inputted as a parameter in the first place (Step S31). In case of the Pentium II processor, "16 Kbytes" is inputted.

Then, an optimal set of the S-boxes is extracted (Step S32). More specifically, in the same manner as the foregoing designing process, a value 32 given as the entire input and output number is divided by a value 5 given as the smallest input and output number of the S-box in the first place, and if there is a remainder, the remainder is allocated to the remotest positions, thereby yielding a set of "6 5 5 5 5 6" as a set of input and output numbers of the S-boxes. After the second and onwards, every two or three input and output numbers are combined repetitively in accordance with the optimization process detailed in FIG. 3 until the optimal combination is obtained.

Then, a combination table of the S-boxes is generated (Step S33). More specifically, as shown in the right side of the drawing, a combination table of each input and output number of the S-box is generated. For example, combination tables 6 and 5 are generated in the first time, and in the second time, a combination table (enlarged S-box) of 11 bits, a combination of 6 and 5, is generated, and these processes are repeated.

Then, whether or not the process should be completed is judged (Step S34). If not (No in Step S34), the cipher designing apparatus returns to Step S32, and repeats the foregoing process; otherwise (Yes in Step S34), each enlarged S-box and linear transformation circuit L are combined (Step S35). Consequently, the linear transformation circuit L is taken into each enlarged S-box, and the process done by the linear transformation circuit L becomes unnecessary, thereby making it possible to accelerate the performance.

Subsequently, as shown in the right side of the drawing, the other components, such as a key adder unit and an input and output unit, are implemented (Step S36), and the implementation of the F-function is completed (Step S37).

According to the above procedure, the parameters (the memory capacity of the primary cache memory and the like) are taken into the cipher designing apparatus from the computer upon implementation to the computer, and the F-function can be generated automatically by finding the optimal input and output number of the S-box based on the cache memory of the primary cache memory and the entire input and output number. Consequently, data of the foregoing Feistel structure shown in FIG. 6 and incorporating the F-function can be generated, and the performance rate can be accelerated by minimizing the number of times for referring to the table placed on the primary cache memory in the computer when encrypting/decrypting a plain text/cipher text.

Figure 8:
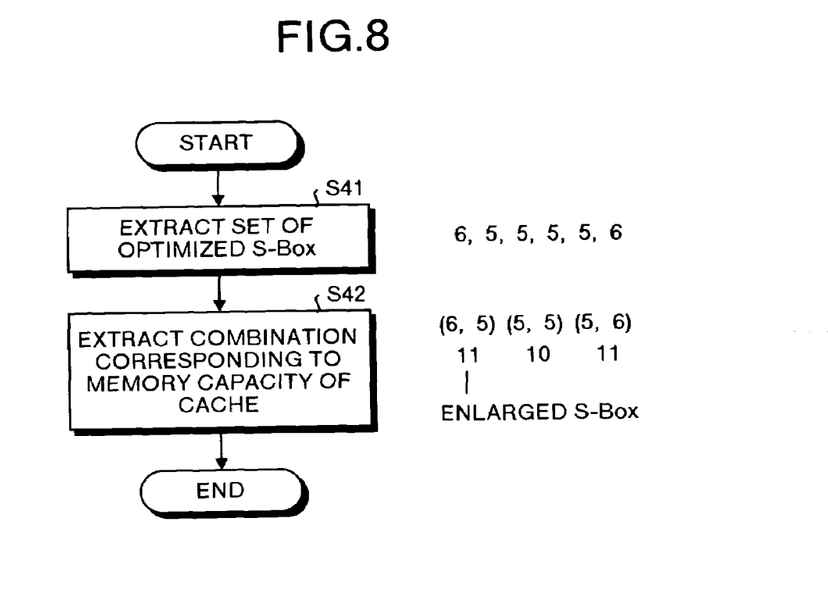
FIG. 8 is a flowchart showing an S-box extraction processing procedure cited in Step S32 of FIG. 7.

Next, the following description will describe more in detail the S-box extraction processing procedure cited in Step S32 of FIG. 7. FIG. 8 is a flowchart showing the S-box extraction processing procedure cited in Step S32 of FIG. 7.

As shown in FIG. 8, a set of the optimized S-boxes is extracted in the first place (Step S41). For example, as shown in the right side of the drawing, a set of "6 5 5 5 5 6" is extracted as a set of the input output bit numbers of the optimized S-boxes.

Then, the combination in accordance with the cache memory capacity of the primary cache memory is extracted (Step S42). Here, every two or three input and output numbers in the extracted set of the input and output numbers of the S-boxes are combined from the left side to generate a new set repetitively until the combination number becomes equal to the foregoing final value a obtained in Step S14 in FIG. 3 as described above. Accordingly, a set of the input and output numbers of the S-boxes having the optimal combination number is determined. For example, a set of "11 10 11" is determined (extracted).

By the above process, the input and output bit numbers of the optimal S-boxes corresponding to the memory capacity of the primary cache memory in the computer can be determined upon implementation to the computer.

Figure 9:
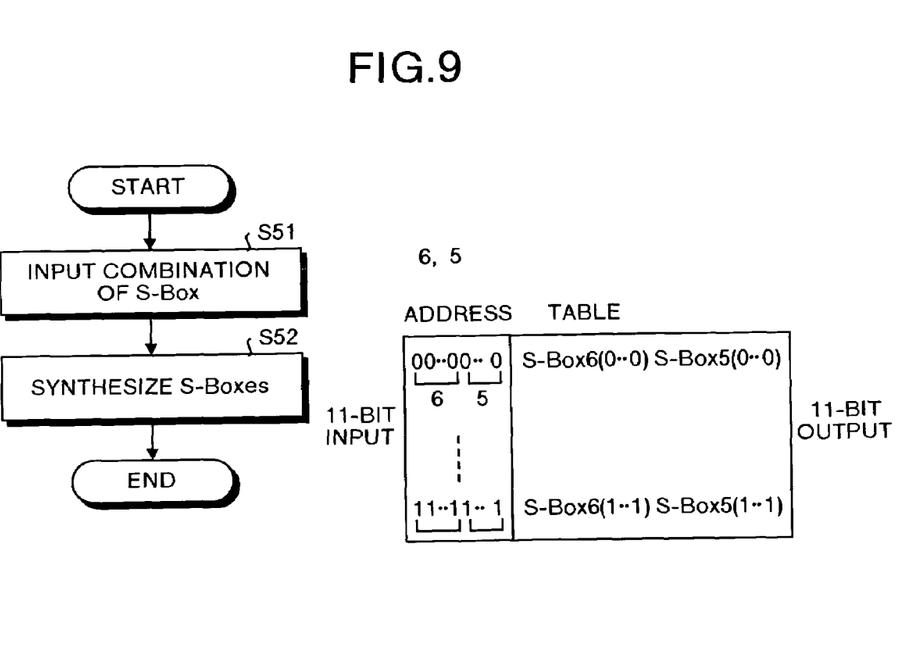
FIG. 9 is a flowchart showing a combination table generation procedure cited in Step S33 of FIG. 7.

Next, the following description will describe the combination table generation procedure cited in Step S33 of FIG. 7. FIG. 9 is a flowchart showing the combination table generation procedure cited in Step S33 of FIG. 7.

As shown in the drawing, the combination of the S-boxes is inputted (Step S51). More specifically, as shown in the right side of the drawing, values of 6 and 5 are inputted as the input and output numbers of the S-boxes, for example.

Subsequently, the S-boxes are combined (Step S52). More specifically, as shown in the right side of the drawing, the input S-boxes are combined to generate an enlarged S-box. Here, an input number of 11 bits is used as an address to generate a non-linear table having an 11-bit output.

By the above process, combination tables (non-linear tables) as many as the combination number of the optimized S-boxes can be generated.

Figure 10:
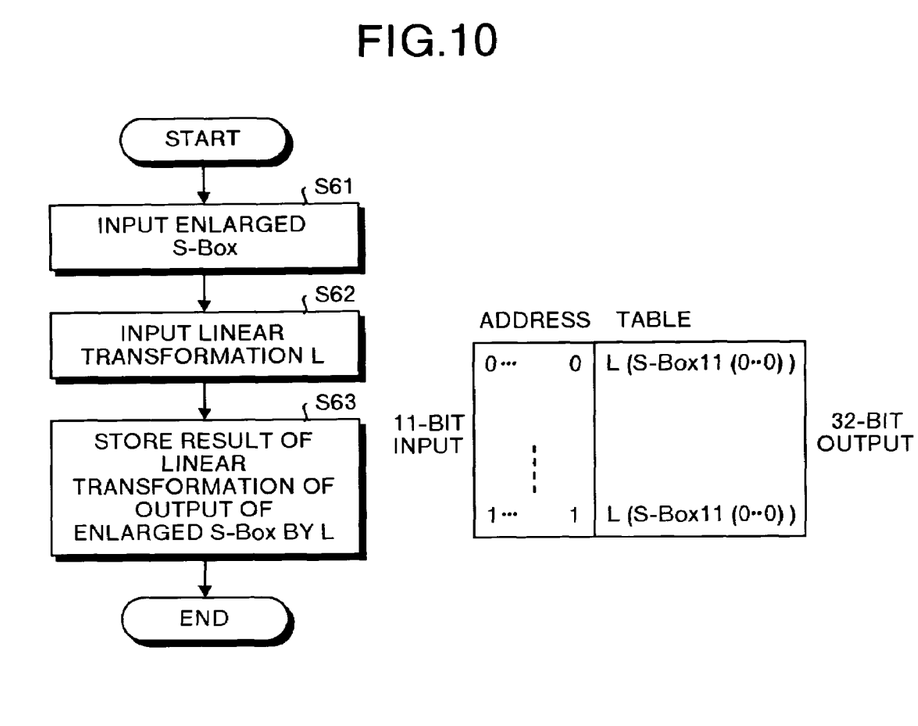
FIG. 10 is a flowchart showing a procedure for combining the S-boxes and a linear transformation L.

Next, the following description will describe the combining procedure for combining the S-box and liner transformation L. FIG. 10 is a flowchart showing the combining procedure for combining the S-box and linear transformation L. As shown in the drawing, after the input of the enlarged S-box (step S61) and the linear transformation L (Step S62), the result of the linear transformation obtained by linear transforming an output of the enlarged S-box by the linear transformation L is stored (Step S63).

More specifically, as shown in the right side of the drawing, the result by linear transforming the output of the enlarged S-box by the linear transformation L is stored in the table shown in the right side, thereby taking the process done by the linear transformation L into the table of the enlarged S-box.

By running the above process, the process done by the linear transformation L is taken into the enlarged S-box. This makes it unnecessary for the linear transformation L to operate at the cipher/decryption process, thereby making it possible to accelerate the performance rate.

Figure 11:
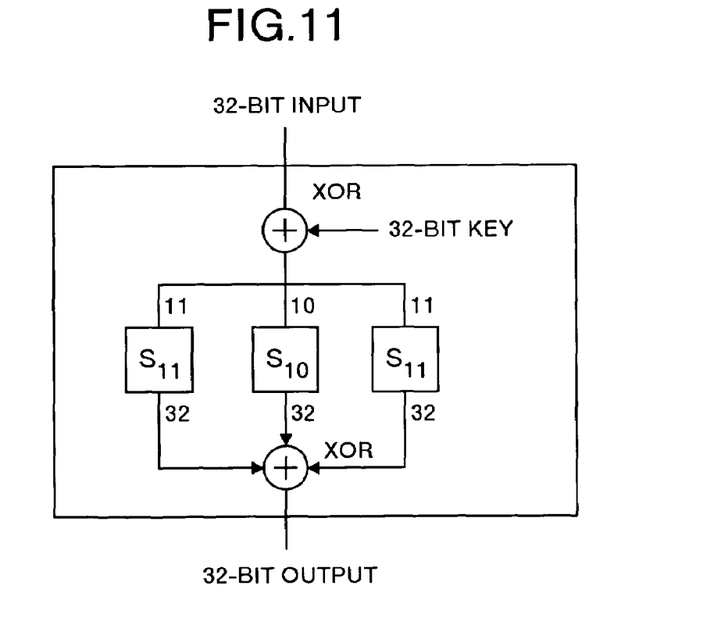
FIG. 11 is a diagram showing an example of the F-function (as implemented) according to an embodiment of the present invention.

Next, the following description will describe an example of the F-function (as implemented) in the present embodiment. FIG. 11 is a diagram showing an example of the F-function of the present embodiment. As shown in the drawing, S11 representing the enlarged S-box after the combining explained in FIG. 10 (S-box of 11), S10 (S-box of 10), and S11 (S-box of 11) are placed and other circuits, such as XOR, are placed as well.

Accordingly, the Feistel structure shown in FIG. 6 is generated based on the F-function, so that a cipher text can be outputted by encrypting a plain text, or a plain text can be outputted by decrypting a cipher text. Meanwhile, the number of times for referring to the table can be minimized by placing the table on the primary cache memory in the computer, thereby making it possible to run the cipher/decryption process at a high speed.

As has been discussed, according to the one aspect of the present invention, the input and output bit number of the plurality of S-boxes is selected based on the memory capacity of the high-speed referable memory provided to the cipher device, and a plurality of S-boxes having the selected input and output bit number are generated. Consequently, as an effect, there can be obtained a method and an apparatus for designing cipher logics capable of selecting swiftly and efficiently an optimal S-box that meets the computer performance when designing the common key block cipher having S-boxes.

Further, because the F-function is generated to have the plurality of S-boxes generated in the above manner, there can be obtained method and an apparatus for designing cipher logics capable of generating an F-function having optimal S-boxes that meet the computer performance as an effect.

Further, the input and output bit number of each S-box is selected in such a manner that a sum of sizes of the plurality of S-boxes becomes largest within a memory capacity of a primary cache memory installed in a processor provided to the cipher device. Consequently, as an effect, here can be obtained method and an apparatus for designing cipher logics capable of fully utilizing the primary cache memory read out in one cycle.

Further, the memory capacity of the primary cache memory and an entire input and output bit number of the block are inputted, and an input and output number of each S-box is tentatively decided by generating an input and output number of each S-box by dividing the inputted entire input and output bit number of the block and allocating a remainder to the input and output number of an arbitrary S-box, while the tentatively decided input and output numbers of the S-boxes are combined within the memory capacity of the primary cache memory. Consequently, there can be obtained method and an apparatus for designing cipher logics capable of selecting swiftly and efficiently the optimal input and output number of the S-box as an effect.

Further, the smallest input and output value of the plurality of S-boxes is specified. Thus, as an effect, there can be obtained method and an apparatus for designing cipher logics capable of selecting the input and output number of the S-box swiftly by not dividing the S-box more than necessary.

Further, the combining of the input and output numbers is completed based on a final value determined by the entire input and output bit number of the block and the memory capacity of the primary cache memory. Hence, as an effect, there can be obtained method and an apparatus for designing cipher logics capable of completing the process when the combination number become equal to the optimal input and output number of the S-box.

Further, the input and output number of each S-box is tentatively decided by allocating the remainder, if there is any, to the input and output numbers of the S-boxes that are placed apart at the remotest positions. Hence, as an effect, there can be obtained method and an apparatus for designing cipher logics capable of making the tentative decision efficiently in an adequate manner.

According to another aspect of the present invention, the recording medium of the present invention stores thereon a computer program which realizes the method according to the present invention on a computer. Accordingly, the method according to the present invention can be realized easily and automatically on the computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cipher designing apparatus for designing cipher logic of a cipher device that effects cipher or decryption per block by using an F-function for converting input bits to output bits using a plurality of S-boxes, said cipher designing apparatus comprising:

an input unit inputting a memory capacity of a high-speed referable memory provided to said cipher device, an entire inputting and outputting bit number being input to and output from said cipher device, and a minimum input and output bit number of said S-boxes as an initial value;

a tentative decision unit dividing the entire input and output bit number by the initial value to acquire an integer quotient and an integer remainder, making a first set composed of the integer quotient pieces of the initial value, subtracting a number of one from the remainder integer number, when the remainder integer number is not zero, and adding the subtracted number of one to the initial value in the first set one by one until the integer value remainder becomes zero, so as to acquire a second set composed of integer numbers, and tentatively deciding the integer numbers in the second set as a tentative inputting and outputting bit number of S-box;

a combining unit combining the integer numbers so as to make a third set of integer composed of combining integers;

a selecting unit determining how many pieces of the combined integers are in the third set, repeating the tentative deciding, combining and determining until a number of the combined integer numbers become equal to a final number that is calculated based on the memory capacity and the entire inputting and outputting bit number, and selecting, when the number of the combined integer numbers becomes equal to the final number, the combined integers of the third set to be an optimal combination of input and output bit numbers of each of the S-box;

a S-box generating unit generating a plurality of S-boxes each having the input and output bit number selected by said selecting unit.

2. The cipher designing apparatus according to claim 1, further comprising a F-function generating unit which generates an F-function having said plurality of S-boxes generated by said S-box generating unit.

3. The cipher designing apparatus according to claim 1 wherein said selecting unit selects the input and output bit number of each S-box in such a manner that a sum of sizes of said plurality of S-boxes becomes largest within a memory capacity of a primary cache memory installed in a processor provided to said cipher device.

4. The cipher designing apparatus according to claim 1, further comprising a smallest input and output number specifying unit which specifies a smallest value of the input and output number of said plurality of S-boxes.

5. The cipher designing apparatus according to claim 1, wherein the high-speed referable memory is a primary cache memory.

6. The cipher designing apparatus according to claim 1, wherein said tentative decision unit tentatively decides the input and output number of each S-box by allocating said remainder, if there is any, to the input and output numbers of the S-boxes that are placed apart at remotest positions.

7. The cipher designing apparatus according to claim 1, wherein said final number is calculated by an integer portion of ((the entire input and output bit number)/$\log_2$ (a size of the high-speed referable memory))+1.

8. A cipher designing method for designing cipher logic of a cipher device that effects cipher or decryption per block by using an F-function for converting input bits to output bits using a plurality of S-boxes, the method comprising:

inputting
a memory capacity of a high-speed referable memory provided to said cipher device, an entire inputting and outputting bit number being input to and output from said cipher device, and a minimum input and output bit number of said S-boxes as an initial value;

dividing the entire input and output bit number by the initial value to acquire an integer quotient and an integer remainder;

making a first set composed of the integer quotient pieces of the initial value;

subtracting a number of one from the remainder integer number, when the remainder integer number is not zero, and adding the subtracted number of one to the initial value in the first set one by one until the integer remainder becomes zero, so as to acquire a second set composed of integer numbers;

tentatively deciding the integer numbers in the second set as a tentative inputting and outputting bit number of S-box;

combining the integer numbers so as to make a third set of integer composed of combined integers;

determining how many pieces of the combined integers are in the third set;

repeating the tentatively deciding, combining and determining until a number of the combined integer numbers becomes equal to a final number that is calculated based on the memory capacity and the entire inputting and outputting bit number;

selecting, when the number of the combined integer numbers becomes equal to the final number, the combined integers of the third set to be an optimal combination of input and output bit numbers of each of the S-box; and generating a plurality of S-boxes each having the input and output bit number selected.

9. The cipher designing method according to claim 8, further comprising:

generating an F-function having said plurality of S-boxes generated.

10. The cipher designing method according to claim 8, wherein when the input and output bit number are selected, the input and output bit number of each S-box is selected in such a manner that a sum of sizes of said plurality of S-boxes becomes largest within a memory capacity of a primary cache memory installed in a processor provided to said cipher device.

11. The cipher designing method according to claim 8, further comprising:

specifying a smallest value of the input and output number of said plurality of S-boxes.

12. The cipher designing method according to claim 8, wherein the high-speed referable memory is a primary cache memory.

13. The cipher designing method according to claim 8, wherein when tentatively deciding input and output number, the input and output number of each S-box is tentatively decided by allocating said remainder, if there is any, to the input and output numbers of the S-boxes that are placed apart at remotest positions.

14. The cipher designing method according to claim 8, wherein said final number is calculated by an integer portion of ((the entire input and output bit number)/$\log_2$ (a size of the high-speed referable memory))+1.

15. A computer readable medium for storing instructions, which when executed by a computer, causes the computer to realizes a cipher designing method for designing cipher logic of a cipher device that effects cipher or decryption per block by using an F-function for converting input bits to output bits using a plurality of S-boxes, the method comprising:

in putting a memory capacity of a high-speed referable memory provided to said cipher device, an entire inputting and outputting bit number being input to and output from said cipher device, and a minimum input and output bit number of said S-boxes as an initial value;

dividing the entire input and output bit number by the initial value to acquire an integer quotient and an integer remainder;

making a first set composed of the integer quotient pieces of the initial value;

subtracting a number of one from the remainder integer number, when the remainder integer number is not zero, and adding the subtracted number of one to the initial value in the first set one by one until the integer remainder becomes zero, so as to acquire a second set composed of integer numbers;

tentatively deciding the integer numbers in the second set as a tentative inputting and outputting bit number of S-box;

combining the integer numbers so as to make a third set of integer composed of combined integers;

determining how many pieces of the combined integers are in the third set;

repeating the tentatively deciding, combining and determining until a number of the combined integer numbers becomes equal to a final number that is calculated based on the memory capacity and the entire inputting and outputting bit number;

selecting, when the number of the combined integer numbers becomes equal to the final number, the combined integers of the third set to be an optimal combination of input and output bit numbers of each of the S-box; and generating a plurality of S-boxes each having the input and output bit number selected.

* * * * *

UNITED STATES PATENT AND TRADEMARK OFFICE
CERTIFICATE OF CORRECTION

PATENT NO. : 7,346,161 B2
APPLICATION NO. : 09/739219
DATED : March 18, 2008
INVENTOR(S) : Takeshi Shimoyama

It is certified that error appears in the above-identified patent and that said Letters Patent is hereby corrected as shown below:

Column 10, Line 38, after "claim 1" insert --,--.

Column 12, Line 16, change "in putting" to --inputting--.

Signed and Sealed this

Nineteenth Day of August, 2008

JON W. DUDAS
*Director of the United States Patent and Trademark Office*